(12) United States Patent
Hyvarinen et al.

(10) Patent No.: US 10,889,445 B2
(45) Date of Patent: Jan. 12, 2021

(54) EXTENDED LIFE CONVEYOR CHAIN TROLLEY AND METHOD

(71) Applicant: Frost Tech LLC, Grand Rapids, MI (US)

(72) Inventors: Richard A. Hyvarinen, Hastings, MI (US); Chuck Deschaine, Grand Rapids, MI (US); Charles C. Frost, Ada, MI (US)

(73) Assignee: Frost Tech LLC, Grand Rapids, MI (US)

( * ) Notice: Subject to any disclaimer, the term of this patent is extended or adjusted under 35 U.S.C. 154(b) by 0 days.

(21) Appl. No.: 16/400,473

(22) Filed: May 1, 2019

(65) Prior Publication Data

US 2020/0346871 A1    Nov. 5, 2020

(51) Int. Cl.
*B65G 17/42* (2006.01)
*B65G 17/38* (2006.01)

(52) U.S. Cl.
CPC .................................. *B65G 17/42* (2013.01)

(58) Field of Classification Search
None
See application file for complete search history.

(56) References Cited

U.S. PATENT DOCUMENTS

| | | | | |
|---|---|---|---|---|
| 2,517,208 | A * | 8/1950 | Hunt | B65G 39/20 295/35 |
| 4,367,905 | A * | 1/1983 | Nauta | B60B 33/0028 384/477 |
| 6,523,665 | B2 * | 2/2003 | Nimmo | B65G 39/02 193/35 R |
| 2002/0179416 | A1 * | 12/2002 | Hoffmann | B65G 17/385 198/844.1 |
| 2018/0031033 | A1 * | 2/2018 | Lavigno, IV | B65G 17/40 |

* cited by examiner

*Primary Examiner* — Kavel Singh
(74) *Attorney, Agent, or Firm* — Mitchell Intellectual Property Law, PLLC

(57) ABSTRACT

An extended life conveyor chain in which a wheeled chain member (e.g. a chain link or chain supporting trolley) includes a projecting detent which engages a detent receiver on a load bearing wheel inner member locking the inner member against rotation with respect to the link. A rotating outer wheel rotates around the inner member. This relieves torsional pressure on a swaged connection between the inner non-rotating wheel portion and a fixed axle on the link and prevents resulting wear.

13 Claims, 5 Drawing Sheets

EXTENDED LIFE CONVEYOR CHAIN TROLLEY AND METHOD

FIELD OF THE INVENTION

The present invention relates to the field of conveyor chains.

BACKGROUND OF THE INVENTION

Conveyor chains, including without limitation floor mounted, apparatus mounted and overhead mounted, are used in numerous manufacturing and processing industries. They comprise links joined by link pins. The chains are typically supported either directly or indirectly by load bearing wheels which run in a supporting track. The so called "bakery chains" are examples of chains which are directly supported by load bearing wheels. At least some of the links (drive links) include load bearing wheels which support the chain vertically, as well as horizontal guide wheels which are load bearing when the chain travels around a curve or a corner. In some systems the chains are supported by trolleys which include load bearing wheels.

Such load bearing wheels often rotate on bearings between a rotating outer wheel portion and a non-rotating inner portion fixedly mounted on a non-rotating axle projecting from the chain link or trolley. The conveyor chains may extend for several hundred to several thousand feet. The cost of such chains entails a substantial expense. Accordingly, manufacturers and processors like to maintain the useful life of a chain as long as possible. Fourteen years is a typical chain life.

One limiting factor on chain life is loosening of the swaged connection of the load bearing wheel axel to the inner non-rotating portion of the wheel. Over time, the connection between the inner wheel portion and the fixed axle works loose and the inner wheel portion begins to rotate on the axle. This accelerate wear and leads to early chain failure.

U.S. Pat. No. 9,950,396 provides a method for re-swaging a non-rotating wheel portion to a fixed axle, thereby providing a method for significantly extending chain life.

SUMMARY OF THE INVENTION

The present invention comprises an extended life conveyor chain and method, in which a wheeled chain member, e.g. a chain link or a chain supporting trolley, includes a projecting detent which engages a detent receiver on a load bearing wheel inner member locking the inner member against rotation with respect to the member. A rotating outer wheel rotates around the inner thus fixed inner member.

This relieves torsional pressure on a swaged connection between the inner non-rotating wheel portion and a fixed axle on the chain member and prevents resulting wear. These and other aspects, advantages and features of the invention will be more fully understood and appreciated by reference to the written description of the preferred embodiments and appended drawings.

DESCRIPTION OF THE PREFERRED EMBODIMENT

Figure 1:
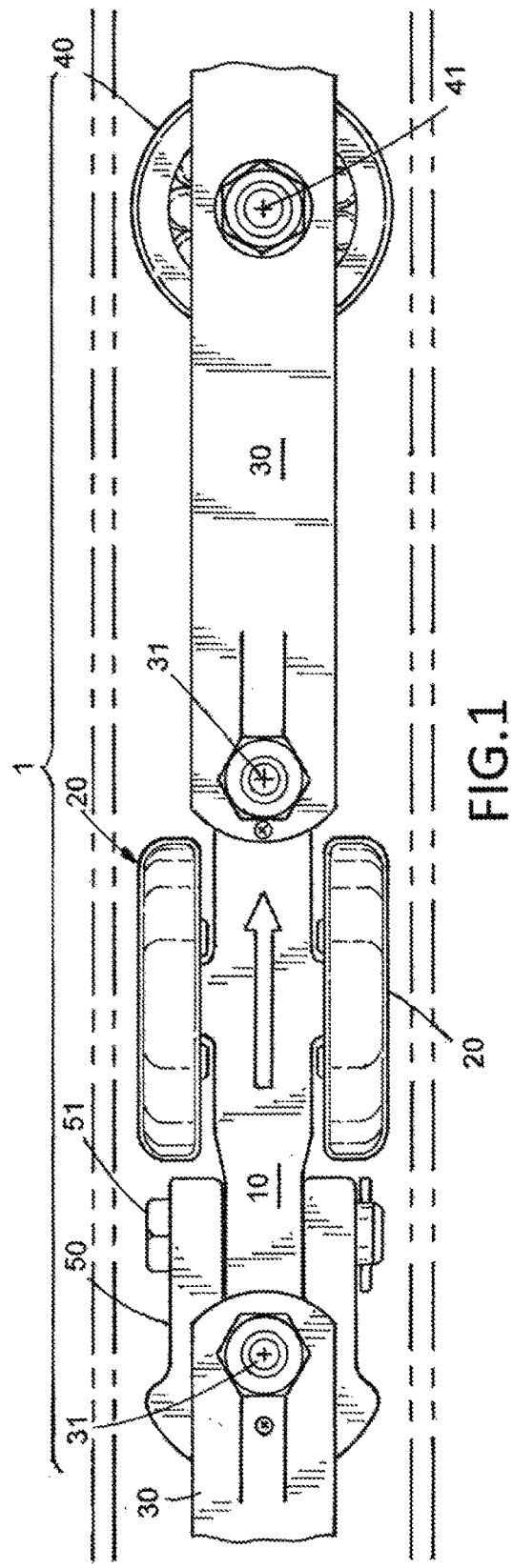
FIG. 1 is a top plane view of a section of a bakery chain.

The preferred embodiment as described herein is a bakery chain. It includes load bearing wheels which are identified as "load wheels 20," as well as so-called "guide wheels 40" which are also load bearing wheels at least when the chain travels around a curve or corner. The "load wheels 20" are connected to "drive links 10," and the "guide wheels 40" are connected to "side links 30." Although not shown or described in this embodiment, another embodiment of the invention would be a trolley supported chain, in which case the load bearing wheels would be connected to the trolley. Thus, the term "load bearing wheel" as used herein refers to "load wheels 20," "guide wheels 40," and "trolley wheels."

The term "wheeled chain member" as used herein refers to any chain member to which "load bearing wheels" are connected. Thus, the "wheeled chain member" could be a "drive link 10," a "side link 30," or a chain supporting "trolley."

Figure 2:
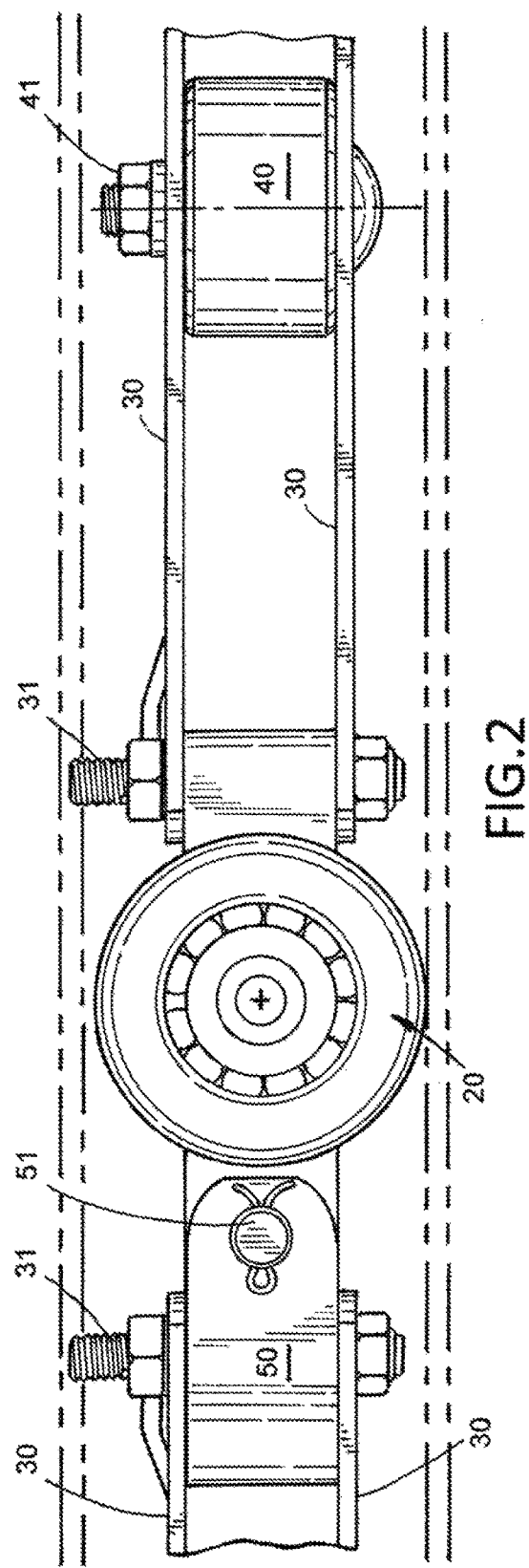
FIG. 2 is a side elevational view of a section of the bakery chain.

A preferred embodiment bakery chain segment 1 includes a drive link 10 to the opposite sides of which load wheels 20 are mounted (FIGS. 1, 2). Side links 30 are linked to the top and bottom of drive link 10 and carry in their midst a guide wheel 40, which is mounted on an axle 41 extending between side links 30. A trailing link 50 is linked embracing the sides of drive link 10 and a pair of side links 30 are attached to opposite sides of trailing link 50 by side link pin 31.

Figure 3:
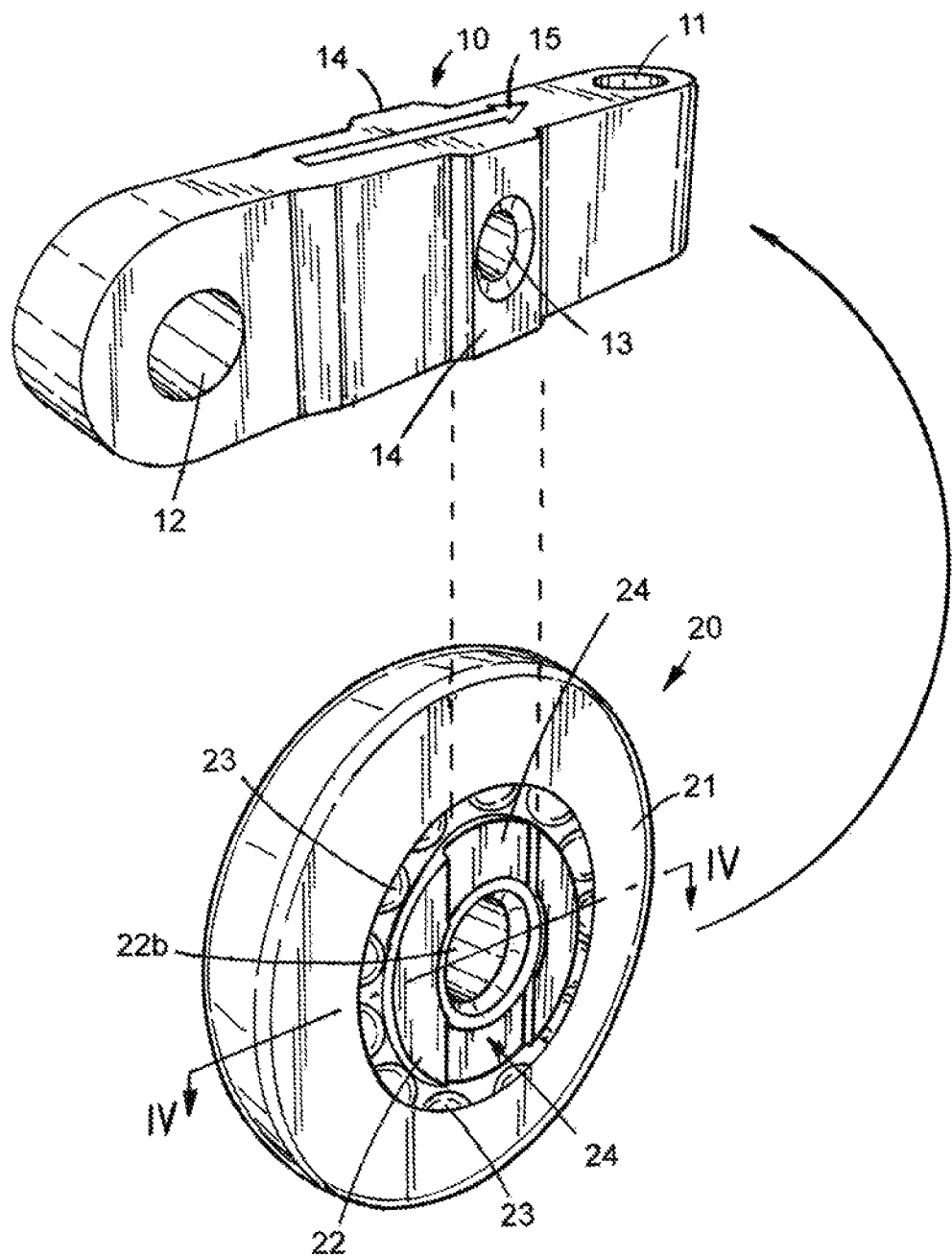
FIG. 3 is an exploded view showing a drive link and a load wheel rotated away from the drive link such that the inside face of the load wheel is visible.

The following is a listing of the various components discussed herein:
1 bakery chain
10 drive link
11 vertical link pin hole
12 lateral link pin hole
13 axel hole
14 detent
20 load wheel (a load bearing wheel)
21 outer wheel
22 Inner wheel
22b inside face of inner wheel
22b hub
23 bearings
24 detent receiver
25 wheel axle
30 side links
31 side link pin
40 guide wheel (a load bearing wheel)
41 guide wheel axle
50 tail link
51 tail link pin Each drive link 10 includes a vertical link pin hole 11 at one end and a lateral link pin hole 12 at the trailing end. The direction of travel of drive link 10 is indicated by the arrow 15 shown on the top of link 10 (FIG. 3). A lateral axle hole 13 extends through the mid body of drive link 10. A detent 14 projects from each side of drive link 10, and in the preferred embodiment surrounds axle hole 13. In the preferred embodiment, detent 14 is generally rectangular in configuration and extends from the top to the bottom of drive link 10, for ease of machining.

Figure 4:
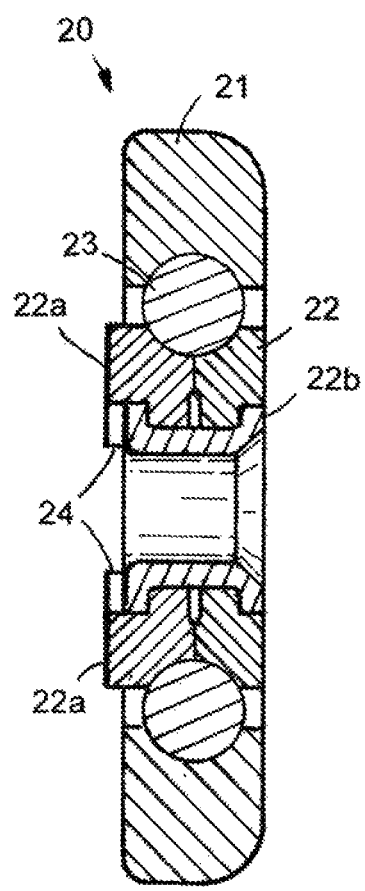
FIG. 4 is a cross sectional view of the load wheel taken on plane IV-IV of FIG. 3.
Figure 5:
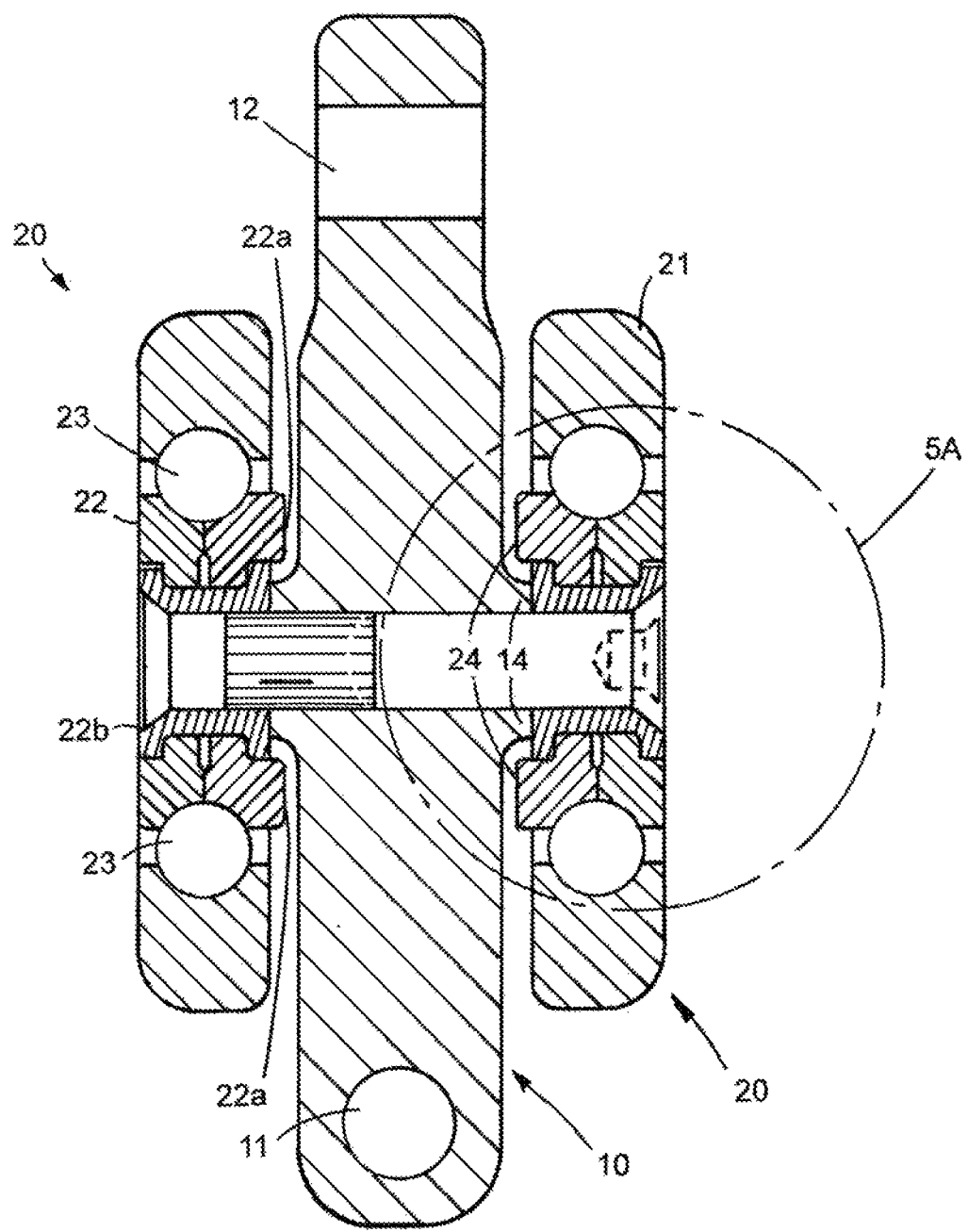
FIG. 5 is a cross sectional view of a drive link with a load wheel attached to each side.

Each load wheel 20 comprises an outer rotating wheel portion 21 and an inner wheel portion 22 which, when assembled to wheel axle 25 and drive link 10 is fixed against rotation (FIGS. 3-5). Wheel axle 25 is fixed within the wheel axle opening 13 of drive link 10. Outer wheel portion 21 and inner portion 22 form a bearing race between them in which a plurality of ball bearings or roller bearings 23 facilitate rotation of outer wheel portion 21 around fixed inner wheel portion 22. Inner wheel portion 22 includes a central hub 22b which is swaged to inner wheel 22, and wheel axle 25 is in turn swaged to the interior of hub 22b.

Figure 5A:
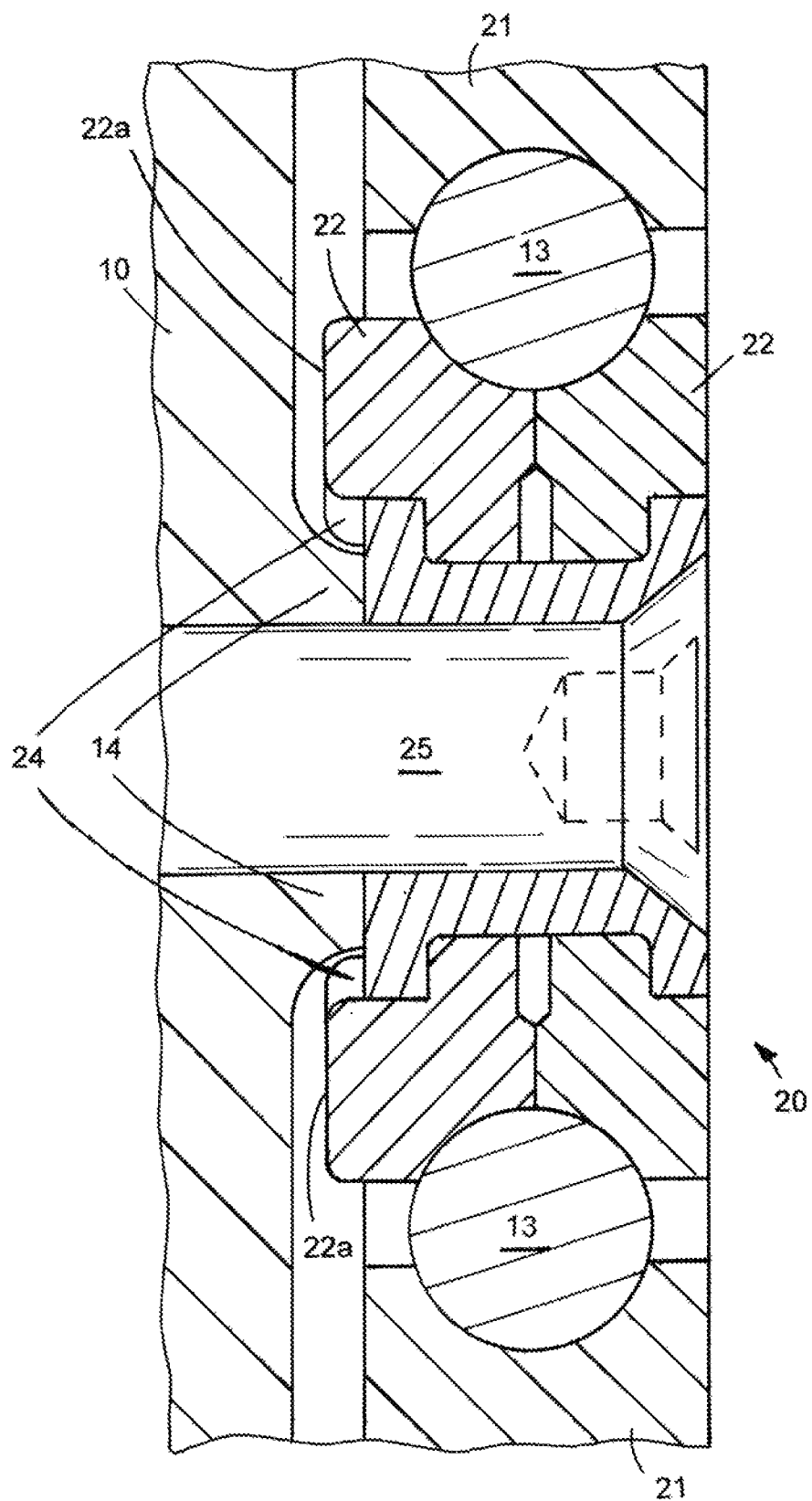
FIG. 5A is an enlarged view of encircled area 5A of FIG. 5.

In the prior art, this swaged connection would loosen and inner wheel portion 22 would rotate around fixed axle 25, thereby causing excessive wear. Alternatively, hub 22b would loosen within the central opening of inner wheel 22. However, in this invention, wheel 20 includes a detent receiver 24 which receives detent 14 of drive link 10 and prevents rotation of inner wheel portion 22 relative to drive link 10. Preferably, the inside face 22a of inner wheel 22 projects outwardly further than the inside face of outer wheel 21 as can be seen in FIG. 4. This allows one to simply machine a channel or slot 24 in the protruding inner face of inner wheel 22 to form the detent receiver for detent 14. Preferably, the slot or channel 24 extends all the way across the inside surface 22a of inner wheel 22 for ease of machining. Detent receiver 24 is rectangular in shape and closely matches the configuration of drive link detent 14 to prevent rotation of inner wheel 22 relative to drive link 10. Detent receiver 24 embraces hub 22b and the opening for wheel axle 25. The positioning of detent 14 within detent receiver 24 can be seen in FIGS. 5 and 5A.

As the assembled chain rolls along its supporting track, shown in phantom in FIGS. 1 and 2, the outer rotating portion 22 of load wheels 20 rotate smoothly on bearings 23 around inner wheel portion 22. Inner wheel portion 22 is fixed against rotation with respect to fixed wheel axle 25 not only through swaging onto wheel axle 25, but also because detent 14 on drive link 10 is engaging detent receiver 24 on load wheel 20, which prevents any rotation even in the event the swaging of axle 25 to hub 22b, or of hub 22 to the interior of inner wheel 22, loosens over time. Locking the inner wheel to the drive link eliminates not only the possibility of the hub spinning on the axle, but it also eliminates the hub spinning in the inner wheel portion.

The detent 14 and detent receiver 24 can have other mating configurations. However, the simple rectangular shapes extending from the top to the bottom of their respective link and inner wheel components are preferred for their ease of manufacture and their sturdiness.

In testing this load wheel design, the bearings were filled with an epoxy to simulate an extreme build-up of debris and corrosion in the bearing. Applying a torque to the load wheel achieved 696 inch/lbs. of force before the epoxy broke free. This is over 11 times the force a load heel would typically experience in a dry track with a load of 125 lbs, and over 34 times the force in a lubed track with a load of 125 lbs. This invention will eliminate chain deterioration resulting from loosening between wage connections of fixed axles to the fixed inner portions of load wheels.

Of course, it is understood that these are preferred embodiments and that various changes and alterations can be made without departing from the spirit of the invention.

The invention claimed is:

1. A conveyor chain wheeled chain member comprising: a wheeled chain member which includes a non-rotating wheel axle projecting therefrom; a load bearing wheel mounted on said non-rotating wheel axle, said load bearing wheel including a wheel inner member non-rotatably mounted on said non-rotating wheel axle, and including a wheel outer member rotatably mounted on said inner member; one of said wheeled chain member and said wheel inner member including a detent projecting therefrom and the other including a detent receiver into which said detent projects; whereby said load bearing wheel inner member is locked against rotation with respect to said wheeled chain member.

2. The wheeled chain member of claim 1 in which: said non-rotating wheel axle is swaged into an opening in said wheel inner member, whereby said locking of said wheel inner member to said wheeled chain member relieves torsional pressure on said swaged connection between the non-rotating wheel inner member and said non-rotating wheel axle and prevents resulting wear in the swaged connection.

3. The wheeled chain member of claim 2 in which: said wheeled chain member comprises a chain link which has a top and a bottom with a side extending therebetween; said detent projecting from said side of said link.

4. A conveyor chain wheeled chain member comprising: a wheeled chain member which includes a non-rotating wheel axle projecting therefrom; a load bearing wheel mounted on said non-rotating wheel axle, said load bearing wheel including a wheel inner member non-rotatably mounted on said non-rotating wheel axle, and including a wheel outer member rotatably mounted on said inner member; said non-rotating wheel axle being swaged into an opening in said wheel inner member, whereby said locking of said wheel inner member to said wheeled chain member relieves torsional pressure on said swaged connection between the non-rotating wheel inner member and said non-rotating wheel axle and prevents resulting wear in the swaged connection; said wheeled chain member comprising a chain link which has a top and a bottom with a side extending therebetween; a detent projecting from said side of said link: said wheel inner member including a detent receiver into which said detent projects; whereby said load bearing wheel inner member is locked against rotation with respect to said wheeled chain member; said projecting detent being generally rectangular in configuration and extending from said top to said bottom of said link for ease of machining.

5. The wheeled chain member of claim 4 in which: said wheel outer member and wheel inner member both include an inside face which faces towards said side of said link; said inside face of said wheel inner member projecting towards said side of said link further than said inside face of said wheel outer member; said detent receiver comprising a channel in said inside face of said wheel inner member extending across said inside face of said inner wheel and having a rectangular shape which closely matches said rectangular configuration of said projecting detent on said wheeled chain member.

6. The wheeled chain member of claim 5 in which: said non-rotating wheel axel extends from said projecting detent on said side of said link; said channel in said inner face of said wheel inner member embracing said opening into which said non-rotating wheel axle is swaged.

7. The wheeled chain member of claim 6 in which: said wheel inner member includes a hub defining said opening into which said non-rotating wheel axle is swaged; said hub being itself swaged into an opening in said wheel inner member.

8. The wheeled chain member of claim 7 in which; said wheel inner and outer members define a bearing race therebetween, such that said wheel outer member rotates on bearings in said bearing race.

9. The wheeled chain member of claim 3 in which: said wheel inner member includes a hub defining said opening into which said wheel axle is swaged; said hub being itself swaged into an opening in said wheel inner member.

10. The wheeled chain member of claim 9 in which; said wheel inner and outer members define a bearing race therebetween, such that said wheel outer member rotates on bearings in said bearing race.

11. A conveyor chain wheeled chain member comprising: a wheeled chain member which includes a non-rotating wheel axle projecting therefrom; a load bearing wheel mounted on said non-rotating wheel axle, said load bearing wheel including a wheel inner member non-rotatably mounted on said non-rotating wheel axle, and including a wheel outer member rotatably mounted on said inner member; said non-rotating wheel axle being swaged into an opening in said wheel inner member, whereby said locking of said wheel inner member to said wheeled chain member relieves torsional pressure on said swaged connection between the non-rotating wheel inner member and said non-rotating wheel axle and prevents resulting wear in the swaged connection; said wheel inner member including a hub defining said opening into which said wheel axle is swaged; said hub being itself swaged into an opening in said wheel inner member; said wheel inner and outer members defining a bearing race therebetween, such that said wheel outer member rotates on bearings in said bearing race; said wheeled chain member comprising a chain link which has a top and a bottom with a side extending therebetween; a detent projecting from said side of said link: said wheel inner member including a detent receiver into which said detent projects; whereby said load bearing wheel inner member is locked against rotation with respect to said wheeled chain member; said projecting detent being generally rectangular in configuration and extending from said top to said bottom of said link for ease of machining.

12. The wheeled chain member of claim 11 in which: said wheel outer member and wheel inner member both include an inside face which faces towards said side of said link; said inside face of said wheel inner member projecting towards said side of said link further than said inside face of said wheel outer member; said detent receiver comprising a channel in said inside face of said wheel inner member extending across said inside face of said inner wheel and having a rectangular shape which closely matches said rectangular configuration of said projecting detent on said wheeled chain member.

13. The wheeled chain member of claim 12 in which: said wheel axel extends from said projecting detent on said side of said link; said channel in said inner face of said wheel inner member embracing said opening into which said wheel axle is swaged.

* * * * *